United States Patent [19]
Wohlwend

[11] 3,981,329
[45] Sept. 21, 1976

[54] SWIVEL TYPE FLUID COUPLING

[76] Inventor: Maurice Wohlwend, 5001 S. 112th St., Seattle, Wash. 98176

[22] Filed: Oct. 20, 1975

[21] Appl. No.: 624,006

[52] U.S. Cl. ............................. 137/615; 285/136; 92/119
[51] Int. Cl.² ...................................... F16L 39/00
[58] Field of Search .............. 137/580, 615, 355.17; 285/136, 272, 273; 92/119

[56] References Cited
UNITED STATES PATENTS

| | | | |
|---|---|---|---|
| 2,578,542 | 12/1951 | Hanson et al. | 285/136 |
| 2,710,598 | 6/1955 | Baas | 285/136 X |
| 2,768,842 | 10/1956 | McDermott | 285/136 |
| 2,781,055 | 2/1957 | Jackson | 285/136 X |
| 2,790,426 | 4/1957 | Mueller | 92/119 |
| 2,823,074 | 2/1958 | Bernard, Jr. | 137/355.17 |
| 3,399,786 | 9/1968 | Honeycutt | 92/119 X |
| 3,446,305 | 5/1969 | Cannon | 180/43 |
| 3,678,810 | 7/1972 | Holmes | 92/119 |

*Primary Examiner*—William R. Cline
*Attorney, Agent, or Firm*—Graybeal, Barnard, Uhlir & Hughes

[57] ABSTRACT

A pair of side-by-side hydraulic fluid supply and return hoses are connected to side-by-side end ports at the free end of a journal block which is located between two spaced apart bearing blocks. A pair of coaxial, oppositely projecting, tubular journals carried by the journal block, and rotationally received in coaxial blind socket portions of passageways formed in the bearing blocks, serve to mount the journal block and hoses connected thereto for pivotal movement relative to the bearing blocks. Passageways in the journal block communicate the side-by-side hose ports with the interiors of the tubular journals which in turn communicate with the passageways in the bearing blocks via the blind sockets. The bearing blocks are detachably mounted onto an upper rear frame portion of a hydraulic tool, such as a hydraulic breaker. The bearing block passageways have ports on corresponding mounting sides of the bearing blocks which communicate with inlet and outlet ports in the tool housing. O-rings surround the tubular journals and the ports on the mounting sides of the bearing blocks, to provide fluid seals at these locations. The hydraulic tool includes a pair of side plates which extend rearwardly from the tool a sufficient amount to form a protective nook in which the swivel coupling is protectively located.

9 Claims, 4 Drawing Figures

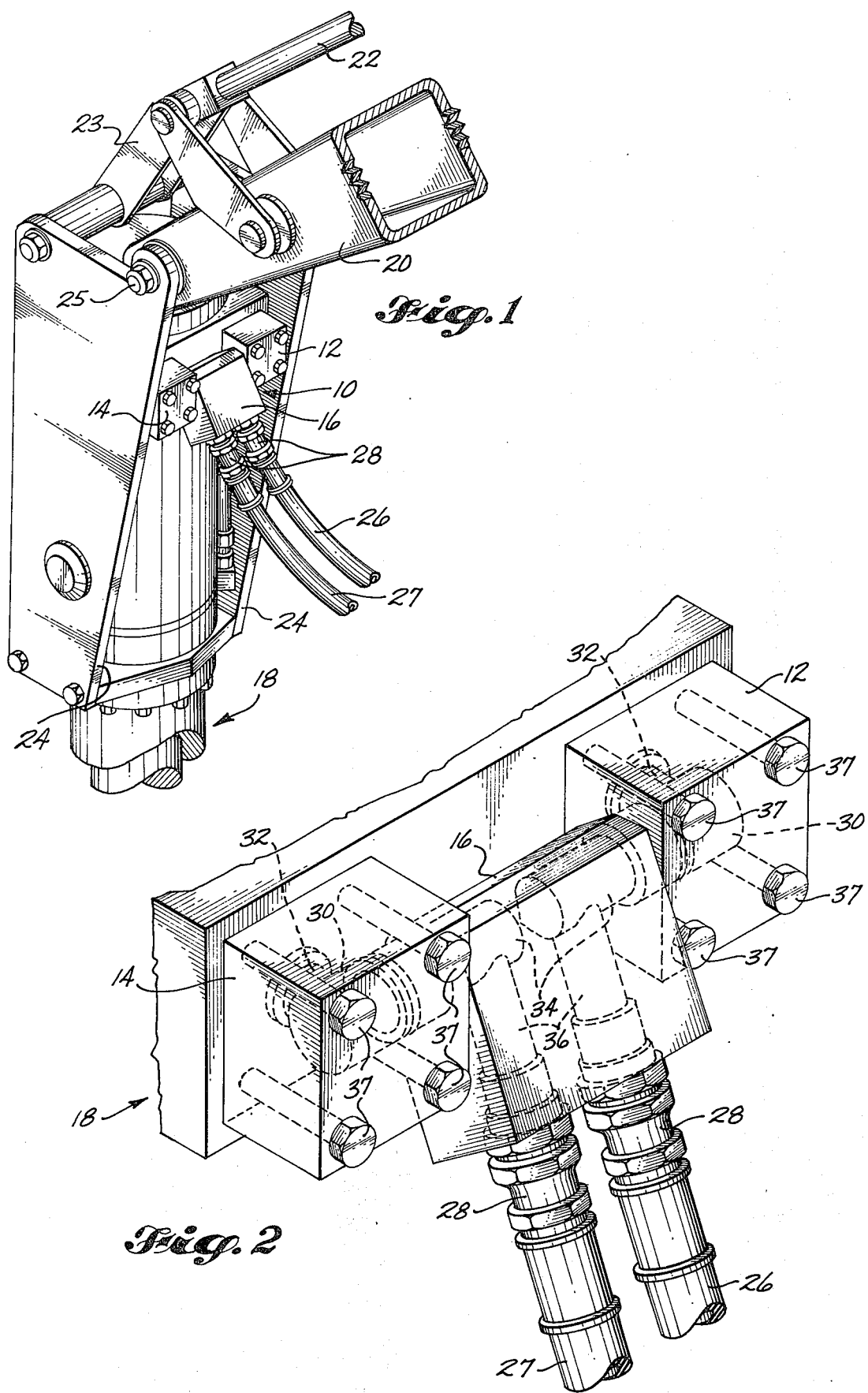

3,981,329

SWIVEL TYPE FLUID COUPLING

BACKGROUND OF THE INVENTION

1. Field of the Invention

This invention relates to a swivel type fluid coupling for use with boom supported hydraulic tools, and in particular to the provision of a low resistance fluid coupling which is relatively small and compact, and to a manner of protecting such coupling against contact damage.

2. Description of the Prior Art

It is common to mount hydraulic tools, such as hydraulic rock breakers, compactors, etc., on the end of a boom carried by a construction vehicle. The tool is mounted for pivotal movement relative to the boom and the boom is itself pivotally mounted on the vehicle. The boom is swung up and down and sideways for positioning the tool. The tool itself is swung relative to the boom for attitude control. Hoses are used for delivering hydraulic fluid from the vehicle to the tool and from the tool back to the vehicle. The tool ends of the hoses are pivotally attached to the tool and the hoses hang free to a degree as they extend back to the vehicle. Presently, it is common to provide an elbow type swivel coupling on each side of the tool. The supply hose is connected to one such coupling and the return hose is connected to the other. It is also common practice to provide the hydraulic tool with shield plates for the couplings, positioned between the couplings and whatever material might be located immediately forwardly of the tool in the vicinity of the couplings.

A disadvantage of side located swivel couplings is that they are not adequately protected against damage from encounters with materials which during use of the tool may be located immediately sideways of the coupling. Also, the known forms of elbow type swivel couplings are relatively large and this contributes to the problem of being able to adequately protect them from damage.

It is an object of the present invention to provide a single swivel coupling for connecting both the hydraulic supply and return hoses to the hydraulic too. The concept of a single swivel coupling for handling both supply and return flow is broadly known in other environments, examples of which are disclosed by the following U.S. Pat. Nos.: 2,710,598, granted June 14, 1955, to Erwin Baas; 2,790,426, granted Apr. 30, 1957 to Otto Mueller; 3,446,305, granted May 27, 1969 to Craig W. Cannon and 3,678,810, granted July 25, 1972 to Lloyd H. Holmes and William D. Dundland.

The type of coupling disclosed by U.S. Pat. Nos. 2,710,598; 2,790,426 and 3,446,305 is basically characterized by a sleeve which is mounted for pivotal movement about a tubular shaft. An annular chamber is formed in the sleeve about the shaft. A plurality of radial ports are formed in the shaft for communicating the interior of the shaft with the annular chamber. A disadvantage of this type of swivel is that because of the radial port arrangement high energy losses are experienced unless the hardware is made quite large.

The coupling disclosed by U.S. Pat. No. 3,678,810 is a very complex specialized form of coupling which would not be suitable for connecting supply and return hoses to a hydraulic tool because it involves concentric passageways.

SUMMARY OF THE INVENTION

For any given size of swivel coupling, the swivel coupling of the present invention presents less resistance to fluid flow. For this reason it is possible to make the swivel coupling of the present invention relatively small and compact.

The swivel coupling of the present invention is basically characterized by a pair of spaced apart bearing blocks and a single journal block located between the bearing blocks. Each of the bearing blocks is formed to include a blind socket which opens towards the space between the bearing blocks. The sockets are of cylindrical shape and are formed about a common axis which is parallel to the axis about which the hydraulic tool pivots relative to the boom. The bearing blocks have corresponding mounting sides and each bearing block includes an internal passageway communicating with its blind socket and extending perpendicularly of such blind socket, from adjacent the closed end thereof, to a port on its mounting side. The journal block includes a pair of coaxial, oppositely extending, open ended tubular journals which are snuggly received within the blind sockets. The tubular journals mount the journal block for pivotal movement relative to the bearing block. The journal block also includes an inflow passageway for hydraulic fluid which communicates with the interior of one of the tubular journals and an outflow passageway for the hydraulic fluid which communicates with the interior of the other tubular journal. Portions of the inflow and outflow passageways extend radially outwardly from the pivotal axis of the journals to ports which are located side-by-side at the free end of the journal block. These ports include connection means for coupling them to the hydraulic supply and return hoses. As should be apparent, the two hoses hang together and exert a substantially balanced force on the journal block which is distributed by the two tubular journals to the two bearing blocks.

The supply and return passageways through the swivel coupling involve straight through axial flow with the most severe conditions encountered being two right angle turns. Owing to this arrangement, it is possible to make the swivel coupling relatively small in size without high energy losses occurring.

According to an aspect of the invention, the swivel coupling is attached to the upper rearward portion of the tool housing. The tool includes a pair of side plates which extend rearwardly a sufficient distance to form a protective nook for the tool. The swivel coupling is in this manner protected against being struck by materials on either side or forwardly of the tool.

It is an important object of the invention to provide a swivel type fluid coupling which allows the supply and return hoses to be maintained closely together.

It is another object of the invention to provide a swivel type fluid coupling which is quite simple and hence inexpensive to manufacture, which is quite small and compact yet experiences low losses, and which is easy to mount onto or remove from the hydraulic tool.

A further object of the present invention is to provide a hydraulic tool that is equipped with a relatively small and compact swivel coupling for connecting both the supply and return hoses to the tool, and side plate means defining a protective nook for the swivel coupling, so that the tool can in use be moved close against rocks, trench walls, etc. without danger of the swivel coupling being contacted and damaged.

Other objects, features and advantages of the invention will be apparent from the following description of the preferred embodiment.

BRIEF DESCRIPTION OF THE DRAWING

FIG. 1 is a pictorial view looking from above and towards one side and the rear of a boom mounted hydraulic breaker, showing a swivel coupling constructed in accordance with the present invention, and including only fragmentary portions of the boom, the hydraulic breaker and the supply and return hoses;

FIG. 2 is an enlarged pictorial view of the swivel coupling assembly, taken from the same aspect as FIG. 1;

DESCRIPTION OF THE PREFERRED EMBODIMENT

Figure 3:
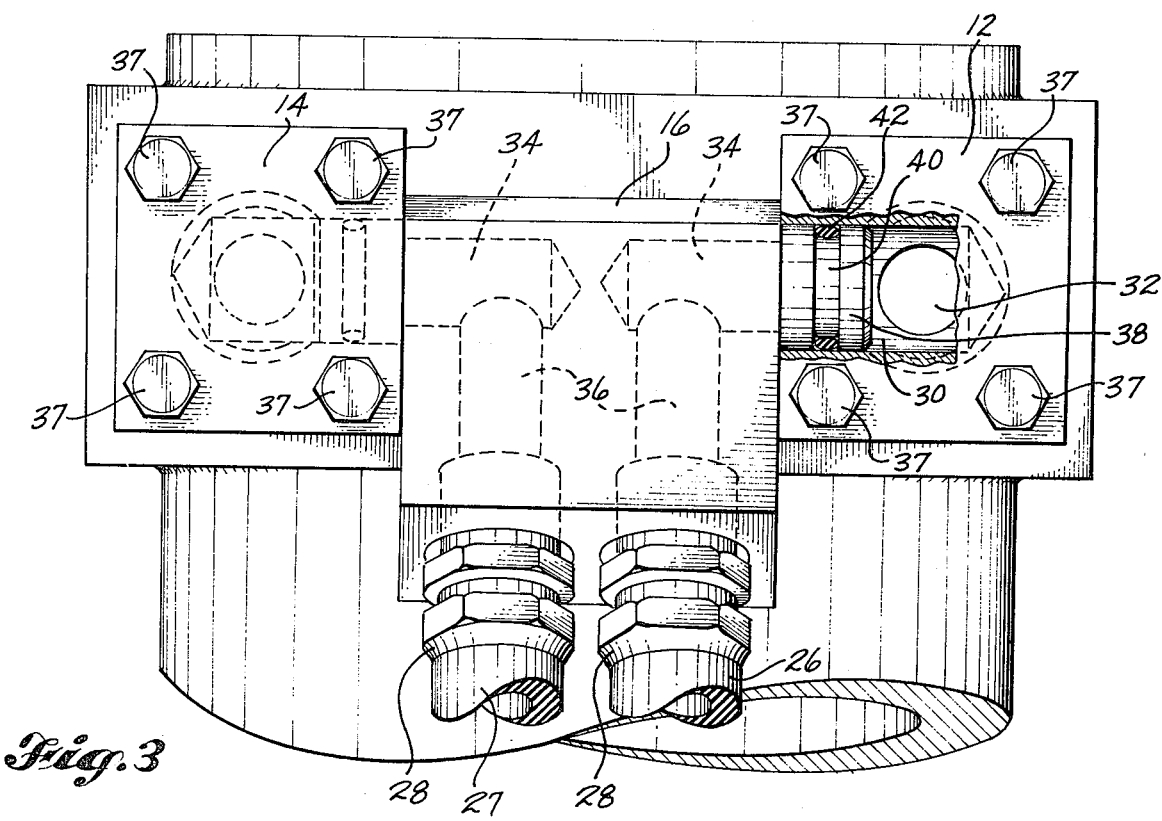
FIG. 3 is an elevational view of the swivel coupling, with a portion of one bearing block being cut away for better illustration of its interior, the tubular journal received therein, and the seal means for the tubular journal.

Referring first to FIG. 1, a swivel type fluid coupling 10 constructed according to the present invention is shown mounted onto the upper rear housing portion of a hydraulic breaker 18. The breaker 18 is pivotally mounted at its upper end to the forward end of a boom 20 which at its rearward end is itself pivotally mounted onto a construction vehicle (not shown). Control linkage 22, 23 is provided for adjusting the tool 18 in angular position or attitude about the transverse axis 25.

Figure 4:
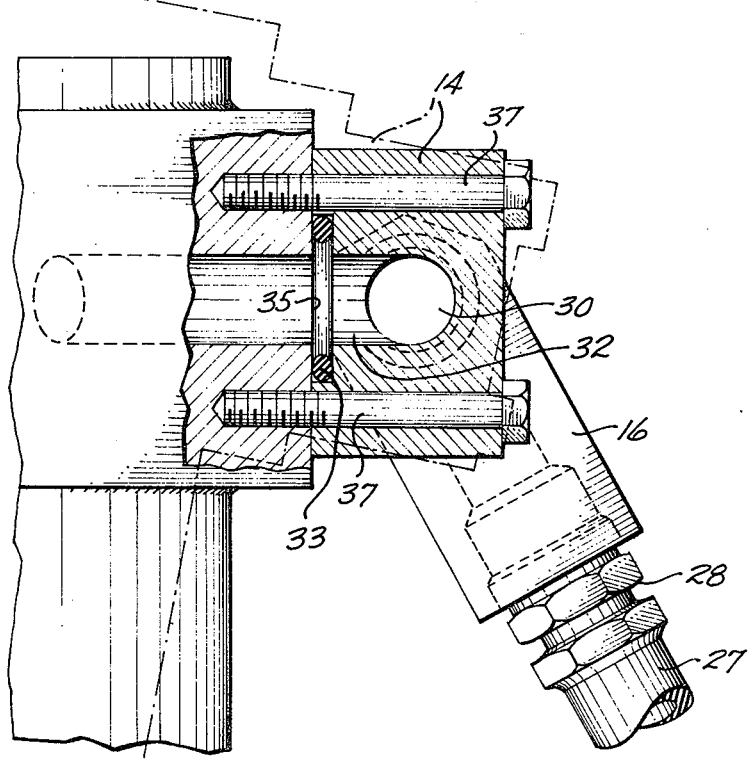
FIG. 4 is an elevational view looking towards the left end of the fluid coupling assembly as it is presented in FIG. 3, with the foreground bearing block being shown in section, and including a phantom line showing of the hydraulic tool in a second attitude.

Referring now to FIGS. 2 – 4, the swivel coupling is shown to comprise a pair of spaced apart bearing blocks 12, 14 and a single journal block 16 located between the bearing blocks 12, 14. Each of the bearing blocks is formed to include a blind socket 30 which opens towards the space between the bearing blocks 12, 14. The sockets 30 are of cylindrical shape and are formed about a common axis which is parallel to the axis 25 about which the hydraulic tool 18 pivots relative to the boom 20. The bearing blocks 12, 14 have corresponding mounting sides and each bearing block 12, 14 includes an internal passageway 32 communicating with its blind socket 30 and extending perpendicularly of such blind socket 30, from adjacent the closed end thereof, to a port on its mounting side.

The journal block includes a pair of coaxial, oppositely extending, open ended tubular journals 38 (FIG. 3) which are snuggly received within the blind sockets 30. The tubular journals 38 mount the journal block 16 for pivotal movement relative to the bearing block 12, 14. The journal block 16 also includes an inflow passageway 34, 36 which communicates with the interior of one of the tubular journals 38 and an outflow passageway 34, 36 for the hydraulic fluid which communicates with the interior of the other tubular journal 38. The portions 36 of the inflow and outflow passageways extend radially outwardly from the pivotal axis of the journals 38 to ports which are located side-by-side at the free end of the journal block 16. These ports include connection means 28 for coupling them to hydraulic supply and return hoses 26, 27. As shown by FIG. 1, the two hoses 26, 27 hang together and exert a substantially balanced force on the journal block 16 which is distributed by the two tubular journals 38 to the two bearing blocks 12, 14.

As shown in FIG. 3, each tubular journal 38 includes a surrounding annular groove 40 which receives a standard O-ring 42, for sealing between the tubular journal 38 and the wall socket 30 in which said journal is received.

Each bearing block 12, 14 is formed to include an annular groove 35 in its mounting side about its port, for receiving an annular compressible seal member 33, i.e. an O-ring. A plurality of openings are formed through each block 12, 14, normal to both the mounting side of such blocks 12, 14 and the surface portion of the breaker housing to which said blocks 12, 14 are secured. Fastener means in the form of bolts or studs 37 extend through said openings and thread into internally threaded sockets which are provided therefor in the head portion of the breaker housing. As should be apparent, when the bolts 37 are tightened they serve to draw the mounting sides of the bearing blocks 12, 14 into tight engagement with the head portion of the hydraulic tool, and also compress the annular seal rings 33 into tight sealing engagement with the surface of said head portion.

As shown by FIGS. 2, 3 and 4, the ports at the mounting side end of passageways 32 are axially aligned with port portions of supply and return passageways in the interior of the breaker housing. By way of typical and therefore non-limitative example, in other respects the breaker 18 may be like the breaker disclosed by my U.S. Pat. No. 3,739,863, granted June 19, 1973.

As shown by FIGS. 2 and 3, the supply and return passageway through the swivel coupling 10 involve straight through axial flow, with the most severe conditions encountered being two right angled turns. Let it be assumed that hose 26 is the supply hose. The hydraulic fluid flows from it through coupling 28 into passageway 36. From passageway 36 it makes a right angle turn into passageway 34 which extends axially through the hollow interior of journal 38 and discharges into the socket 30. From socket 30 is makes another right angle turn and travels through passageway 32 into the internal supply passageway formed in the breaker housing. At the opposite side of the coupling, the returning hydraulic fluid flows out from the internal passageway in the breaker housing into passageway 32 which intersects with the blind socket 30. The fluid makes a right angle turn at this juncture and then flows axially through the trunnion 38, then axially through passageway 34. From passageway 34 it makes another right angle turn and then flows through passageway 36, then coupling 28, and into return hose 27. Passageways 32, 34, 36, and the passageways in the trunnions 38 (which are extensions of passageway 34) are preferably substantially equal in diameter. The sockets 30 are somewhat larger in diameter in that it must be sized to receive the outside diameter of the journals 38.

The just described construction of the passageways, and the manner in which such passageways are located in the bearing blocks 12, 14, 16, and the provision and arrangement of the tubular journals 38, all contribute to the simplicity of the coupling and make it possible to make such coupling relatively small in size and compact.

Referring again to FIG. 1, in preferred form, the coupling 10 is mounted onto the upper rear portion of the breaker housing. The breaker is equipped with a pair of relatively large area side plates 24 which are sized to extend rearwardly far enough so that they outwardly bound the bearing blocks 12, 14, and with the boom and the breaker housing form a protective nook for the coupling. Housed within such nook, the coupling 10 is protected against contact from obstacles on either side and forwardly on the breaker. The sloping nature of the rear edges of side plates 24 also provide substantial protection from contact with at least most obstacles which might be encountered rearwardly of the breaker 18.

The just described embodiment is to be considered in all respects as illustrative and not restrictive. The scope of the invention is defined by the appended claims rather than by the fore-going description, and all changes within the range and equivalency of the claims are to be considered within the scope of the invention.

What is claimed is:

1. A swivel coupling for use between hanging hydraulic fluid supply and return hoses and a hydraulic tool which is pivotally mounted onto the outer end of a boom which is itself pivotally mounted at its inner end onto a construction machine, said coupling comprising:

a pair of spaced apart bearing blocks, each of which is formed to include a blind socket opening towards the space between said bearing blocks, said sockets being of cylindrical shape and being formed about a common axis which is parallel to the axis about which the hydraulic tool pivots relative to the boom, said bearing blocks having corresponding mounting sides, said bearing blocks also including internal passageways communicating with said blind sockets and extending perpendicularly of said blind sockets from adjacent the closed ends of the blind sockets to ports on the mounting sides of the bearing blocks, and a journal block located between said bearing blocks and including a pair of coaxial, oppositely extending, open ended tubular journals which are snuggly received within said blind sockets, to mount said journal block for pivotal movement relative to said bearing blocks, said journal block being formed to include an inflow passageway for hydraulic fluid which communicates with the interior of one of said tubular journals, and an outflow passageway for hydraulic fluid which communicates with the interior of the other tubular journal, with portions of said inflow and outflow passageways extending radially outwardly of the pivotal axis of the journals to ports which are located side-by-side on an end of the journal block, said ports including connection means for coupling them to the hydraulic supply and return hoses.

2. A swivel coupling according to claim 1, wherein each tubular journal includes a surrounding annular groove, and an annular seal member is located in said groove, for sealing between the tubular journal and the wall of the socket in which said journal is received.

3. A swivel coupling according to claim 1, wherein each bearing block is formed to include an annular groove formed in its mounting side about its port, for receiving an annular compressable seal member, and fastener means for connecting each said bearing block to the hydraulic tool in a manner drawing its mounting side into tight engagement with such hydraulic tool and compressing its annular seal member into tight sealing engagement with a surface of said hydraulic tool.

4. A swivel coupling according to claim 3, wherein said fastener means for each bearing block comprises a plurality of bolts which extend through holes in the bearing block which are spaced about, and extend parallel to, the internal passageway in such block, and which are adapted to thread into threaded bores formed in a frame portion of the hydraulic tool.

5. A hydraulic tool which in use is pivotally mounted onto the outer end of a boom which is itself pivotally mounted at its inner end onto a construction machine, and a swivel coupling for use between hanging hydraulic fluid supply and return hoses and said hydraulic tool, said hydraulic tool comprising:

means for pivotally attaching it to the outer end of a boom, for pivotal movement about an axis extending transversely of the boom, and an upper rear frame portion located closely below said transverse axis, said hydraulic tool also including internal fluid inlet and outlet passageways having spaced apart inlet and outlet ports formed in said upper rear frame portion; and said swivel coupling comprising:

a pair of space apart bearing blocks detachably mounted onto the upper rear frame portion of the hydraulic tool, each of said bearing blocks being formed to include a blind socket opening towards the space between said bearing blocks, said sockets being of cylindrical shape and being formed about a common axis which is parallel to the axis about which the hydraulic tool pivots relative to the boom, said bearing blocks having corresponding mounting sides in contact with the upper rear frame portion of the hydraulic tool, said bearing blocks also including internal passageways communicating with said blind sockets and extending from adjacent the closed ends of the blind sockets to ports on the mounting sides of the bearing blocks, in alignment with the inlet and outlet ports of the internal passageways in said hydraulic tool; and a journal block located between said bearing blocks and including a pair of coaxial, oppositely extending, open ended tubular journals which are snugly received within said blind sockets, to mount said journal block for pivotal movement relative to said bearing blocks, said journal block being formed to include an inflow passageway for hydraulic fluid which communicates with the interior of one of said tubular journals, and an outflow passageway for hydraulic fluid which communicates with the interior of the other tubular journal, with portions of said inflow and outflow passageways extending radially outwardly of the pivotal axis of the journals to ports which are located side-by-side on an end of the journal block, said ports including connection means for coupling them to the hydraulic supply and return hoses.

6. A swivel coupling according to claim 5, wherein each tubular journal includes a surrounding annular groove, and an annular seal member is located in said groove, for sealing between the tubular journal and the wall of the socket in which said journal is received.

7. A swivel coupling according to claim 5, wherein each bearing block is formed to include an annular groove formed in its mounting side about its port, for receiving an annular compressable seal member, and fastener means connecting each said bearing block to the hydraulic tool in a manner drawing its mounting side into tight engagement with such hydraulic tool and compressing its annular seal member into tight sealing engagement with a surface of said hydraulic tool.

8. A swivel coupling according to claim 7, wherein said fastener means for each bearing block comprises a plurality of bolts which extend through openings in the bearing block which are spaced about the internal passageway in such block, and which thread into threaded bores formed in the upper rear frame portion of the hydraulic tool.

9. A swivel coupling according to claim 5, wherein said hydraulic tool further includes a pair of side members which extend rearwardly towards the construction machine from which the boom and the tool are supported, laterally outwardly of the bearing blocks, to form a protective nook in which said swivel coupling is located and substantially protected.

* * * * *